(12) United States Patent
Kemp et al.

(10) Patent No.: US 10,394,886 B2
(45) Date of Patent: Aug. 27, 2019

(54) ELECTRONIC DEVICE, COMPUTER-IMPLEMENTED METHOD AND COMPUTER PROGRAM

(71) Applicant: Sony Corporation, Tokyo (JP)

(72) Inventors: Thomas Kemp, Esslingen (DE); Fabien Cardinaux, Stuttgart (DE); Wilhelm Hagg, Stuttgart (DE); Aurel Bordewieck, Kirchheim unter Teck (DE); Stefan Uhlich, Renningen (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/354,285

(22) Filed: Nov. 17, 2016

(65) Prior Publication Data

US 2017/0161367 A1 Jun. 8, 2017

(30) Foreign Application Priority Data

Dec. 4, 2015 (EP) .................................... 15198119

(51) Int. Cl.

| | |
|---|---|
| ***G10L 15/22*** | (2006.01) |
| ***G10L 15/00*** | (2013.01) |
| ***G06F 17/00*** | (2019.01) |
| ***G06F 16/683*** | (2019.01) |
| ***G06F 17/27*** | (2006.01) |
| ***G10L 15/26*** | (2006.01) |

(52) U.S. Cl.
CPC .......... *G06F 16/685* (2019.01); *G06F 17/278* (2013.01); *G10L 15/26* (2013.01)

(58) Field of Classification Search
CPC ......... G10L 15/22; G10L 15/00; G10L 11/00; G06F 17/00
USPC .................................................. 704/251, 270
See application file for complete search history.

(56) References Cited

U.S. PATENT DOCUMENTS 6,816,858 B1 * 11/2004 Coden ................... G06F 16/748
707/750
8,037,070 B2 * 10/2011 Maghoul ............. G06F 16/3329
707/736
8,731,934 B2 * 5/2014 Olligschlaeger .... H04M 3/2281
704/270
9,454,957 B1 * 9/2016 Mathias ................ G10L 15/187
9,721,570 B1 * 8/2017 Beal ...................... G10L 17/005
2008/0082578 A1 * 4/2008 Hogue .................. G06F 3/0482
2009/0144609 A1 * 6/2009 Liang ...................... G06F 17/21
715/230
2009/0327263 A1 * 12/2009 Maghoul ............ G06F 16/3329
(Continued)

OTHER PUBLICATIONS

Miller, "Google Gets Fresh with Algorithm Update Affecting 35% of Searches", Nov. 2011,https://searchenginewatch.com/sew/news/2122861/google-gets-fresh-with-algorithm-update-affecting-35-of-searches.*

(Continued)

*Primary Examiner* — Seong-Ah A Shin
(74) *Attorney, Agent, or Firm* — Xsensus LLP

(57) ABSTRACT

An electronic device comprising a processor which is configured to perform speech recognition on an audio signal, linguistically analyze the output of the speech recognition for named-entities, perform an Internet or database search for the recognized named-entities to obtain query results, and display, on a display of the electronic device, information obtained from the query results on a timeline.

13 Claims, 7 Drawing Sheets

(56) References Cited

U.S. PATENT DOCUMENTS

| | | | | |
|---|---|---|---|---|
| 2011/0320458 | A1* | 12/2011 | Karana | G06F 16/972 707/741 |
| 2012/0245944 | A1* | 9/2012 | Gruber | G10L 15/22 704/270.1 |
| 2013/0110505 | A1* | 5/2013 | Gruber | G10L 15/22 704/9 |
| 2013/0275164 | A1* | 10/2013 | Gruber | G10L 17/22 705/5 |
| 2014/0236793 | A1* | 8/2014 | Matthews | G06Q 40/00 705/35 |
| 2014/0254777 | A1* | 9/2014 | Olligschlaeger | H04M 3/2281 379/88.01 |
| 2017/0262412 | A1* | 9/2017 | Liang | G06F 17/21 |

OTHER PUBLICATIONS

Miller, "Google Gets Fresh with Algorithm Update Affecting 35% of Searches", Nov. 2011, https://searchenginewatch.com/sew/news/2122861/google-gets-fresh-with-algorithm-update-affecting-35-of-searches (Year: 2011).*

Ze'ev Rivlin, et al., "Maestro: Conductor of Multimedia Analysis Technologies", SRI International, http://www.chic.sri.com/projects/Maestro.html, 2000, 7 pgs.

* cited by examiner

| Named entity | Context |
|---|---|
| president | Barack Obama, White House, George Bush, George Washington, lawyer |
| Dow Jones | stock market, DJIA, index, S&P, price, economy, bull, bear |
| quarterback | touchdown, NFL, football, offensive |
| weather | sun, rain, temperature, wind, snow, tomorrow, cold, hot |

Fig. 7

ELECTRONIC DEVICE, COMPUTER-IMPLEMENTED METHOD AND COMPUTER PROGRAM

TECHNICAL FIELD

The present disclosure generally pertains to electronic devices, computer-implemented methods and computer programs for such electronic devices.

TECHNICAL BACKGROUND

Recently a clear tendency has been observed of users of media reproduction devices such as TVs or radio sets to use further electronic devices while watching television or listening to radio. In particular, users show a greater frequency of use of a tablet or a smartphone when watching television, for example for producing comments or posts on social networks about the content that is being watched or listened.

The term "second screen" has been formed to describe computing devices (commonly a mobile device, such as a tablet or smartphone) that are used while watching television or listening to radio. A second screen may for example provide an enhanced viewing experience for content on another device, such as a television. Second screen devices are for example used to provide interactive features during broadcast content, such as a television program. The use of a second screen supports social television and generates an online conversation around the specific content.

Not only when listening to radio, watching newscasts, documentaries, or even movies, but also in many everyday situations, for example during discussions between people, additional information about the topic of discussion (or of the movie/audio) is desirable. Smartphones and tablets make it possible to manually launch a search request to a search engine and collect the desired information. However, it is cumbersome and distracting, and often disruptive (in a discussion), to launch that search request.

Thus, although there exist techniques for launching a search request to a search engine, it is generally desirable to provide improved devices and methods for providing users with information.

SUMMARY

According to a first aspect the disclosure provides an electronic device comprising a processor which is configured to perform speech recognition on an audio signal, linguistically analyze the output of the speech recognition for named-entities, perform an Internet or database search for the recognized named-entities to obtain query results, and display, on a display of the electronic device, information obtained from the query results on a timeline.

According to a further aspect the disclosure provides a computer-implemented method, comprising: retrieving an audio signal from a microphone, performing speech recognition on the received audio signal, linguistically analyzing the output of the speech recognition for named-entities, performing an Internet or database search for the recognized named-entities to obtain query results, and displaying, on a display of an electronic device, information obtained from the query results on a timeline.

According to a still further aspect the disclosure provides a computer program comprising instructions, the instructions when executed on a processor of an electronic device, causing the electronic device to: retrieve an audio signal from a microphone, perform speech recognition on the received audio signal, linguistically analyze the output of the speech recognition for named-entities, perform an Internet or database search for the recognized named-entities to obtain query results, and display, on a display of the electronic device, information obtained from the query results on a timeline.

Further aspects are set forth in the dependent claims, the following description and the drawings.

BRIEF DESCRIPTION OF THE DRAWINGS

Embodiments are explained by way of example with respect to the accompanying drawings, in which:

FIG. 7 illustrates an example for a representation of named-entities in a context database.

DETAILED DESCRIPTION OF EMBODIMENTS

Figure 1:
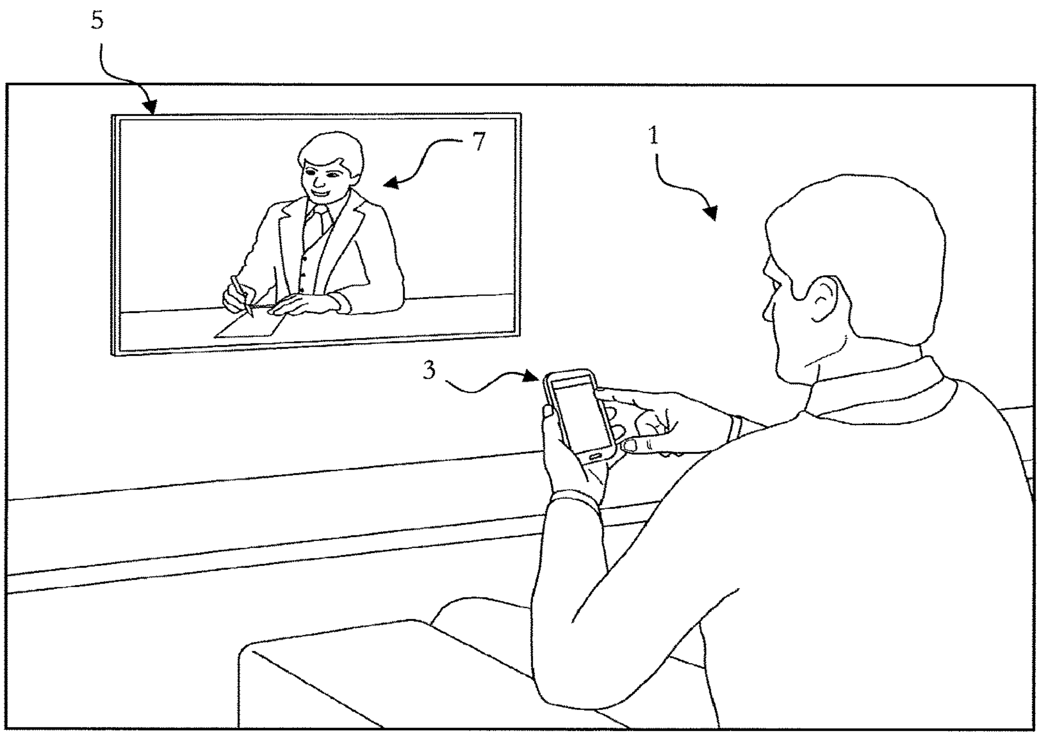
FIG. 1 schematically depicts a typical "second screen" situation.

Before a detailed description of the embodiments under reference of FIG. 1, general explanations are made.

In the embodiments described below, an electronic device comprises a processor which is configured to perform speech recognition on an audio signal, linguistically analyze the output of the speech recognition for named-entities, perform an Internet or database search for the recognized named-entities to obtain query results, and display, on a display of the electronic device, information obtained from the query results on a timeline.

The electronic device may be any computing device such as a smartphone, a tablet computer, notebook, smart watch or the like. According to some embodiments, the electronic device is used as a second screen device. According to other embodiments, the electronic device is used during a conversation.

The processor of the electronic device may be configured to retrieve an audio signal from a microphone. This microphone may be a built-in microphone of a smartphone, tablet or notebook. Alternatively, the microphone may be an external microphone which is attached to the electronic device.

The retrieved audio signal may for example relate to a communication between humans, or other speech like e.g. from a newscast in radio or TV.

Performing speech recognition on an audio signal may comprise any computer-implemented method of converting an audio signal representing spoken words to text. Such methods are known to the skilled person. For example, Hidden Markov models, Dynamic time warping (DTW)-based speech recognition, Neural networks, and/or Deep Neural Networks and Other Deep Learning Models may be used to implement speech recognition.

According to the embodiments, the output of the speech recognition is linguistically analyzed for named-entities. Named-entities may for example be any kind of elements in a text. Named-entities may for example describe objects such as persons, organizations, and/or locations. In some embodiments, named-entities can be categorized into pre-defined categories such as the names of persons, names of organizations, names of locations, expressions of times, expressions of quantities, etc.

A linguistic analysis for named-entities may for example be performed using natural language processing. Natural language processing may be based on techniques of computer science, artificial intelligence, and computational linguistics concerned with the interactions between computers and human (natural) languages. Natural language processing may enable computers to derive meaning from human or natural language input.

Performing an Internet or database search for recognized named-entities to obtain query results may comprise using an application programming interface (API) to access a database. Alternatively, performing an Internet or database search for the recognized named-entities may also comprise using software libraries that provide functionality of web clients for automatically filling out a search field of an online encyclopedia to obtain a search result in the form of a webpage. Still alternatively, performing an Internet or database search for the recognized named-entities may also comprise searching for webpages which provide information about the named-entity at issue. This may for example comprise automatically performing an Internet search with regard to the named-entity. For example, an Internet search engine may be used to perform such a search. A most relevant search result retrieved from the search engine may be used as the result of the query.

The database may be an encyclopedic database. An encyclopedic database may contain a comprehensive summary of information from either all or many branches of knowledge, or from particular branches of knowledge.

An encyclopedic database may reside at a remote location, for example on a server in the Internet. Alternatively, an encyclopedic database may also reside in a local area network (LAN) to which the electronic device is connected. Still alternatively, an encyclopedic database may reside within a memory inside the electronic device or attached to the electronic device. The same holds for a search engine which might in alternative embodiments be used to automatically obtain information concerning a named-entity from the Internet.

Displaying, on a display of the electronic device, information obtained from such query results may comprise displaying the information on a timeline. For example, the processor of the electronic device may be configured to extract from the information obtained from such a query result a picture related to a search result that symbolizes a named-entity, and to display the picture obtained from the Internet search on its display.

The processor may further be configured to perform the speech recognition and the linguistic analysis continuously in order to build up a set of query results. Such a set of query results may form the basis for a timeline representation of the named-entities related to the query results.

A result of the Internet or database search may be an encyclopedic entry of an encyclopedic database. The encyclopedic entry may for example have the form of a webpage. Alternatively, it may have the form of an XML document, of a text document, or the like.

The processor of the electronic device may use known HTML parsing techniques, XML parsing, or screen scraping technologies to automatically extract information from an Internet or database search result.

In general, any excerpt of a search query result can be used to generate a timeline entry for a named-entity. A timeline entry may for example be symbolized by a retrieved picture, by a text string related to the named-entity, or a time stamp. The timeline entry may comprise a link to the Internet or to an encyclopedic database, for example in the form of an URL or the like. This way, a user of the electronic device may quickly and without any waiting get more information about the topic that is currently under discussion. For example, if a user is watching a documentary about slavery in the US, and Thomas Jefferson's ambiguous role is mentioned, the system will get e.g. an online encyclopedia article about Thomas Jefferson, thereby allowing the user to find out why Jefferson's stance towards slavery is mentioned (and what Jefferson said about slavery in the first place, of course). Still further, if the user is watching a newscast, the named-entity recognition unit might identify named-entities such as the named-entity "channel 1" (the name of the channel which is responsible for the newscast), the named-entity "Barack Obama" (relating to a current politic topic addressed by the speaker1), the named-entity "Quarterback" (relating to a sports result announced by the speaker), the named-entity "Dow Jones" (relating to an economics item announced by the speaker), and/or the named-entity "weather" (relating to the "weather forecast" announced by the speaker at the end of the newscast).

The processor may further be arranged to disambiguate and correct or suppress misrecognitions by using the semantic similarity between the named-entity in question, and other named-entities that were observed around the same time.

For example, the processor may be arranged to approximate semantic similarity by evaluating co-occurrence statistics.

The processor may further be arranged to evaluate co-occurrence statistics on large background corpora. Any kind of text documents may be used to generate such large background corpora. For example, webpages, transcripts of newscasts or movies, newspaper articles, books or the like can be used to build large background corpora. Such background corpora can be extracted and analyzed off line to generate co-occurrence data.

According to the embodiments, a computer-implemented method may comprise: retrieving an audio signal from a microphone, performing speech recognition on the received audio signal, linguistically analyzing the output of the speech recognition for named-entities, performing an Internet or database search for the recognized named-entities to obtain query results, and displaying, on a display of an electronic device, information obtained from the query results on a timeline.

Still further, according to the embodiments, a computer program may comprise instructions, the instructions when executed on a processor of an electronic device, causing the electronic device to retrieve an audio signal from a microphone, perform speech recognition on the received audio signal, linguistically analyze the output of the speech recognition for named-entities, perform an Internet or database search for the recognized named-entities to obtain query results, and display, on a display of the electronic device, information obtained from the query results on a timeline.

The disclosure may provide an automatic way of providing additional information that is context sensitive, requires no manual intervention, and is not intrusive.

Second Screen Situation

FIG. 1 schematically depicts a typical "second screen" situation. A user 1 is sitting in front of a TV device 5, watching a newscast. A newscast speaker 7 is depicted on TV device 5. The user 1 shows particular interest in a specific topic addressed by newscast speaker 7, here for example the announcement of the results of a football match that took place some hours before the newscast appeared on the TV device 5. User 1 takes his smartphone 3 in order to query an encyclopedic sports database on the Internet (not shown in FIG. 1) for more information about the specific quarterback who initiated very successful offensives during the football match at issue. The information retrieved from the encyclopedic sports database is displayed on the touch screen of smartphone 3. User 1 thus uses his smartphone as a "second screen" for digesting information related to the newscast watched on TV device 5.

Figure 2:
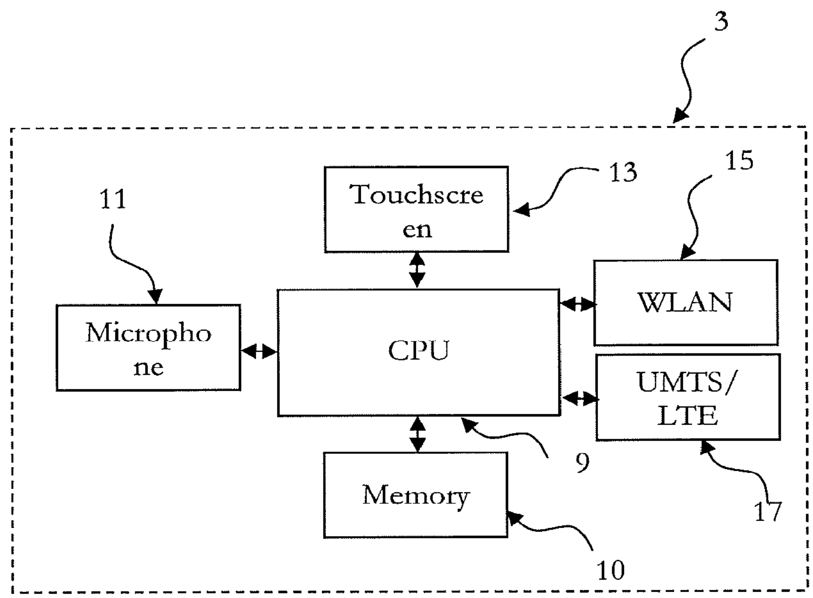
FIG. 2 schematically shows a smartphone 3 which is an example of an electronic device.

FIG. 2 schematically shows a smartphone 3 which is an example of an electronic device which can be used as a second screen device. Smartphone 3 comprises a processor 9 (also called central processing unit, CPU), a memory 10, a microphone 11 for capturing sound from the environment, and a touchscreen 13 for displaying information to the user and for capturing input commands from a user. Still further, the smartphone 3 comprises a WLAN interface 15 for connection of the smartphone to a local area network (LAN). Still further, the smartphone 3 comprises a UMTS/LTE interface 17 for connection of the smartphone 3 to a wide area network (WAN) such as a cellular mobile phone network.

Microphone 11 is configured to capture sound from the environment, for example sound signals reflecting speech emitted by a TV device when a newscast speaker announces news, as depicted in the exemplifying second screen situation of FIG. 1. Microphone 11, by means of a respective microphone driver, produces a digital representation of the captured sound which can be further processed by processor 9.

Processor 9 is configured to perform specific processing steps, such as processing digital representation of sound captured by microphone 11, such as sending data to or receiving data from WLAN interface 15 or UMTS/LTE interface 17, or such as initiating the displaying of information on touch screen 13 or retrieving input commands from touch screen 13. To this end, processor 9 may for example implement software, e.g. in the form of a software application or the like.

Memory 10 may be configured to store program code for carrying out the computer-implemented process described in these embodiments. Still further, in embodiments where an encyclopedic database or context database (described in more detail below) does not reside remotely to smartphone 3, memory 10 may store such an encyclopedic database or context database.

Encyclopedic Database

Figure 3:
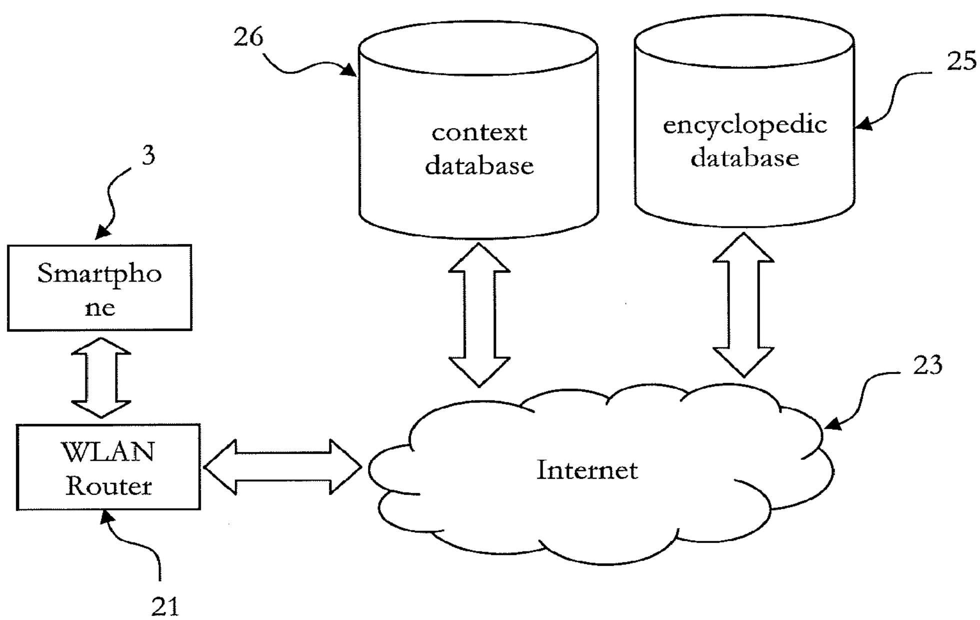
FIG. 3 schematically shows a system in which a smartphone is connected to an encyclopedic database and to a context database by means of the Internet.

FIG. 3 schematically shows a system in which a smartphone 3 is connected to an encyclopedic database 25 by means of the Internet 23 (and to a context database which will be explained later on with regard to the aspect of co-occurence statistics). The smartphone 3, by means of its WLAN interface, is connected to WLAN router 21. WLAN router 21 and Internet 23 enable communication between smartphone 3 and servers in the Internet. In particular, smartphone 3 can communicate with a server which stores an encyclopedic database 25. The encyclopedic database contains a comprehensive summary of information from either all branches of knowledge or from particular branches of knowledge.

For example, the encyclopedic entry for a person in the encyclopedic database may comprise a photo of the person and a description of the person's vita. Further, the encyclopedic entry for an organization may for example comprise a photo of the organization's head quarter, information about the number of people working for the organization, and the like.

Each entry of the encyclopedic database may be tagged with keywords in order to make queries to the encyclopedic database easier.

An exemplifying encyclopedic database of this embodiment comprises an application programing interface (API), that is a web service that provides convenient access to database features, data, and meta-data, e.g. over HTTP, via an URL, or the like. The processor of the second screen device of this embodiment may use this API to query the encyclopedic database.

Although in the example of FIG. 3 there is depicted only one encyclopedic database 25, the smartphone could also be configured to communicate with several encyclopedic databases, in particular with encyclopedic databases which are specialized on a particular branch of knowledge.

Still alternatively, the processor of smartphone 3 might query Internet search engines (not shown in FIG. 3) to retrieve information about certain topics, persons, organizations, or the like. The querying of an Internet search engine can be performed with the same technical means as described above with regard to encyclopedic databases.

Natural Language Processing (NLP)

In the following, processes are described which can be used to linguistically analyze the output of speech recognition for named-entities.

The linguistic analysis, according to the embodiments, is performed by natural language processing (NLP), that is using techniques of computer science, artificial intelligence, and computational linguistics concerned with the interactions between computers and human (natural) languages. Natural language processing enables computers to derive meaning from human or natural language input.

In the following embodiments, named-entity recognition (NER) which is an example of natural language processing, is used for locating and classifying elements in a text into predefined categories. Still further, in the embodiments described below, computing co-occurrence data is described. Both these tasks can be performed with NLP tools that are known to the skilled person. For example, the Apache OpenNLP library may be used as a machine learning based toolkit for the processing of natural language text. OpenNLP supports the most common NLP tasks, such as tokenization, sentence segmentation, part-of-speech tagging, named entity extraction, chunking, parsing, and coreference resolution. The capabilities of OpenNLP are known to the skilled person from the "Apache OpenNLP Developer Documentation", Version 1.6.0, which is written and maintained by the Apache OpenNLP Development Community and which can be freely obtained from opennlp.apache.org.

Named-Entity Recognition (NER)

Named-entity recognition (NER) aims at locating and classifying elements in a text into predefined categories such as the names of persons, names of organizations, names of locations, expressions of times, expressions of quantities, etc.

Named-entity recognition may use linguistic grammar-based techniques as well as statistical models, i.e. machine learning. In the embodiments, a statistical named-entity recognition is used, as it is known to the skilled person. The above mentioned NLP toolkit OpenNLP includes rule based and statistical named entity recognition which can be used for the purposes of the embodiments disclosed below. Such a statistical named-entity recognition approach may use a large amount of manually annotated training data to recognize named-entities.

Figure 4:
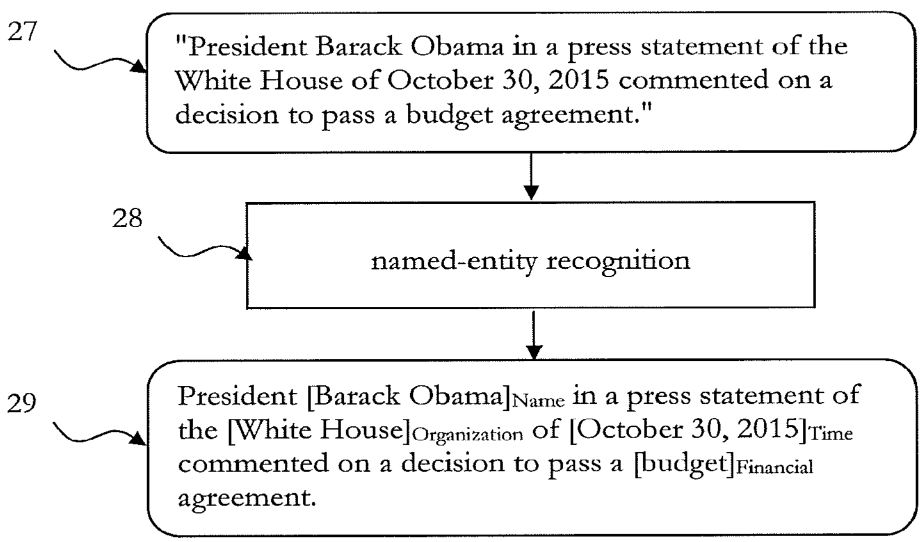
FIG. 4 displays an example of a named-entity recognition section.

FIG. 4 displays an example of a named-entity recognition section 28. The named-entity recognition section 28 is configured to receive a block of text 27 and to output an annotated block of text 29 that identifies named-entities found in the input text 27. In the embodiment of FIG. 4 the block of text 27 input to the named-entity recognition section 28 is "President Barack Obama in a press statement of the White House of Oct. 30, 2015 commented on a decision to pass a budget agreement."The corresponding annotated block of text 29 that identifies named-entities produced by named-entity recognition section 28 is, according to this example, "President [Barack Obama]$_{Name}$ in a press statement of the [White House]$_{Organization}$ of [Oct. 30, 2015]$_{Time}$ commented on a decision to pass a [budget]$_{Financial}$ agreement."That is, the named-entity recognition section 28 has identified the personal name "Barack Obama", the organizational name "White House", the date "Oct. 30, 2015" and the financial term "budget" within in the block of text 27.

Automatic Timeline Generation

According to the embodiments, the processor of a second screen device is configured to display information obtained from query results to the Internet or to an encyclopedic database on a timeline.

The named-entities obtained during named-entity recognition may for example be used for automatically querying an encyclopedic database located within the Internet. For example, a specific named-entity identified during named-entity recognition may be used as search term for querying an encyclopedic database. The encyclopedic database returns, as result of the search query, its entry for the named-entity at issue. This entry may be in the form of a webpage comprising text, figures and pictures. For each query result, the second screen device generates a short extract of the search result. An extract of a search result may for example be a picture related to a search result that symbolizes the named-entity at issue. The extract of the search result is automatically arranged on a timeline and displayed to the user of a second screen device.

According to the embodiments described below, each timeline is symbolized by a retrieved picture, by a text string related to the named-entity and/or by a time stamp.

Figure 5:
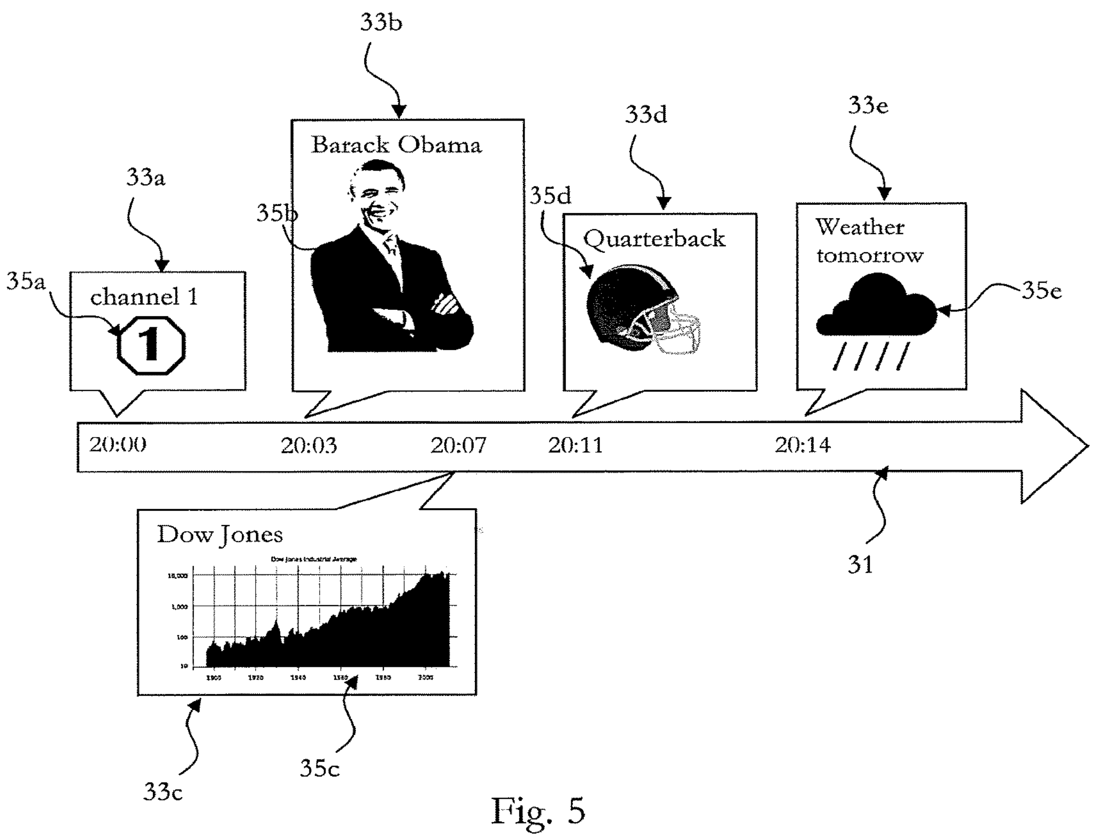
FIG. 5 depicts an exemplifying embodiment of displaying information obtained from query results to an encyclopedic database on a timeline.

FIG. 5 depicts an exemplifying embodiment of displaying information obtained from query results to an encyclopedic database on a timeline. A timeline 31 is arranged in the middle of the display screen of the second screen device, extending from left to right. For each named-entity identified during named-entity recognition, the extract of the search result of the respective named-entity is displayed in a box 33*a*-33*e*. Each box 33*a-e* points to a respective position on timeline 31 which represents the point in time at which the respective named-entity has been recognized by the named-entity recognition. Each such position on the timeline is indicated by a respective time stamp.

At time 20:00 the named-entity recognition has identified the named-entity "channel 1". The second screen device uses this named-entity to automatically query an encyclopedic database. The encyclopedic database returns its entry for "channel 1" which is a webpage comprising a description of "channel 1" and a picture 35*a* representing the logo of channel 1. This picture 35*a* is extracted from the webpage. The named-entity "channel 1" together with the extracted picture is displayed in box 33*a* and box 33*a* is drawn in such a way that it points towards a point on the timeline which represents the time 20:00 at which the named-entity "channel 1" was observed during named-entity recognition. Picture 35*a*, the named-entity displayed in box 33*a*, and/or the complete box 33*a* may be configured as a link pointing to the respective "channel 1" entry of the encyclopedic database, so that when the user touches the picture 35*a*, the named-entity displayed in box 33*a*, and/or the complete box 33*a*, the second screen device displays the complete "channel 1" entry of the encyclopedic database to the user so that the user can retrieve as many further information about "channel 1" as he wants to obtain.

At time 20:03 the named-entity recognition has identified the named-entity "Barack Obama". The second screen device uses this named-entity to automatically query an encyclopedic database. The encyclopedic database returns its entry for "Barack Obama" which is a webpage comprising a description of "Barack Obama" and a picture 35*b* representing Barack Obama. This picture 35*b* is extracted from the webpage. The named-entity "Barack Obama" together with the extracted picture 35*b* is displayed in box 33*b* and box 33*b* is drawn in such a way that it points towards a point on the timeline which represents the time 20:03 at which the named-entity "Barack Obama" was observed during named-entity recognition. Picture 35*b*, the named-entity displayed in box 33*b*, and/or the complete box 33*b* may be configured as a link pointing to the respective "Barack Obama" entry of the encyclopedic database, so that when the user touches the picture 35*b*, the respective named-entity displayed in box 33*b*, and/or the complete box 33*b*, the second screen device displays the complete "Barack Obama" entry of the encyclopedic database to the user so that the user can retrieve as many further information about "Barack Obama" as he wants to obtain.

At time 20:07 the named-entity recognition has identified the named-entity "Dow Jones". The second screen device uses this named-entity to automatically query an encyclopedic database. The encyclopedic database returns its entry for "Dow Jones" which is a webpage comprising a description of "Dow Jones" and a picture 35*c* representing "Dow Jones". This picture 35*c* is extracted from the webpage. The named-entity "Dow Jones" together with the extracted picture 35*c* is displayed in box 33*c* and box 33*c* is drawn in such a way that it points towards a point on the timeline which represents the time 20:07 at which the named-entity "Dow Jones" was observed during named-entity recognition. Picture 35*c*, the named-entity displayed in box 33*c*, and/or the complete box 33*c* may be configured as a link pointing to the respective "Dow Jones" entry of the encyclopedic database, so that when the user touches the picture 35*c*, the respective named-entity displayed in box 33*c*, and/or the complete box 33*c*, the second screen device displays the complete "Dow Jones" entry of the encyclopedic database to the user so that the user can retrieve as many further information about "Dow Jones" as he wants to obtain.

At time 20:11 the named-entity recognition has identified the named-entity "Quarterback". The second screen device uses this named-entity to automatically query an encyclopedic database. The encyclopedic database returns its entry for "Quarterback" which is a webpage comprising a description of "Quarterback" and a picture 35*d* representing "Quarterback". This picture 35*d* is extracted from the webpage. The named-entity "Quarterback" together with the extracted picture 35*d* is displayed in box 33*d* and box 33*d* is drawn in such a way that it points towards a point on the timeline which represents the time 20:11 at which the named-entity "Quarterback" was observed during named-entity recognition. Picture 35*d*, the named-entity displayed in box 33*d*, and/or the complete box 33*d* may be configured as a link pointing to the respective "Quarterback" entry of the encyclopedic database, so that when the user touches the picture 35*d*, the respective named-entity displayed in box 33*d*, and/or the complete box 33*d*, the second screen device displays the complete "Quarterback" entry of the encyclopedic database to the user so that the user can retrieve as many further information about "Quarterback" as he wants to obtain.

At time 20:14 the named-entity recognition has identified the named-entity "weather". The second screen device uses this named-entity to automatically query an encyclopedic database. The encyclopedic database returns its entry for "weather" which is a webpage comprising a description of "weather" and a picture 35*e* representing "weather". This picture 35*e* is extracted from the webpage. The named-entity "weather" together with the extracted picture 35*e* is displayed in box 33*c* and box 33*e* is drawn in such a way that it points towards a point on the timeline which represents the time 20:14 at which the named-entity "weather" was observed during named-entity recognition. Picture 35*e*, the named-entity displayed in box 33*e*, and/or the complete box 33*e* may be configured as a link pointing to the respective "weather" entry of the encyclopedic database, so that when the user touches the picture 35*e*, the respective named-entity displayed in box 33*e*, and/or the complete box 33*e*, the second screen device displays the complete "weather" entry of the encyclopedic database to the user so that the user can retrieve as many further information about "weather" as he wants to obtain.

The processor of the second screen device may be configured in such a way that new named-entities are added at the right side of the timeline 31 and in such a way that timeline 31 scrolls from right to left as soon as new named-entities are added at the right side of timeline 31. A user may swipe left and right to explore specific points on the timeline 31, in particular entries concerning past named-entities which have already scrolled out of the field of view.

In the embodiment of FIG. 5 the time stamps are displayed on timeline 31. In alternative embodiments, time stamps may as well be displayed within the respective boxes 33*a-e*.

Figure 6:
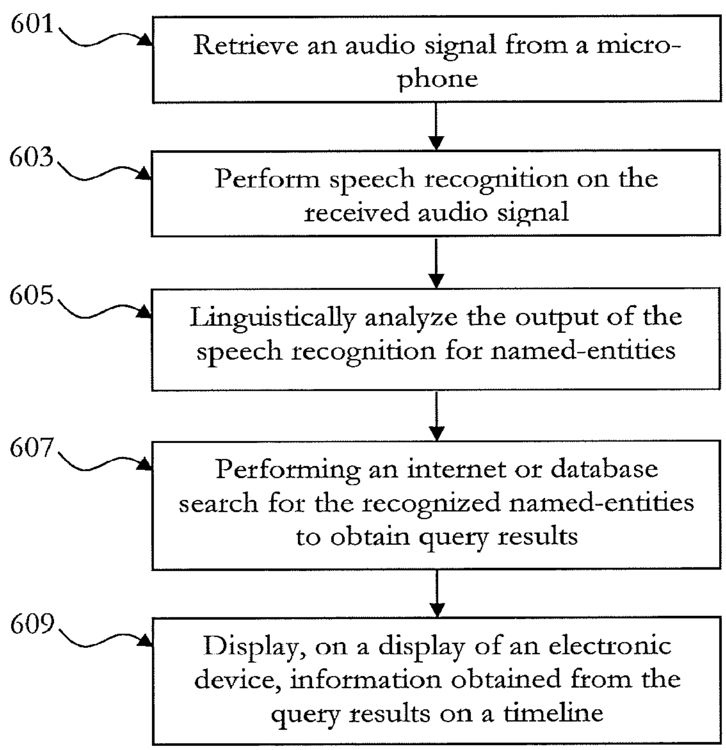
FIG. 6 schematically illustrates an embodiment of a computer-implemented method for generating a timeline based on automatic named-entity recognition.

FIG. 6 schematically illustrates an embodiment of a computer-implemented method for generating a timeline based on automatic named-entity recognition. At 601, an audio signal is retrieved from a microphone. At 603, speech recognition is performed on the received audio signal. At 605, the output of the speech recognition is linguistically analyzed for named-entities. At 607, an Internet or database search for the recognized named-entities is performed to obtain query results. At 609, information obtained from the query results is displayed, on a display of an electronic device, on a timeline.

Co-Occurrence Statistics

While following a discussion, it is likely that the second screen device will sometimes misrecognize a word. Additionally, there are concepts that have several meanings and that require disambiguation (e.g., 'bass' as a fish or a musical instrument). In both cases, the system can disambiguate and correct or suppress misrecognitions by using the semantic similarity between the named-entity in question, and other named-entities that were observed around the same time. Semantic similarity can for example be approximated by evaluating co-occurrence statistics on large background corpora.

Co-occurrence is a linguistics term that relates to the occurrence frequency of two terms from a text corpus alongside each other in a certain order. Co-occurrence in this linguistic sense can be interpreted as an indicator of semantic proximity or an idiomatic expression. Words co-occurrence statistics thus can capture the relationships between words.

In this embodiment, a very large text corpus is used to determine co-occurrence statistics between named-entities. To this end, named-entities are identified in the corpus. Next, co-occurrence data (e.g. a co-occurrence matrix) is computed of all named-entities in the corpus. In general, the co-occurrence data describes the probability that two named-entities are somehow related to each other and can thus directly or indirectly reflect semantic relations in the language.

Words co-occurrence statistics may be computed by counting how many times two or more words occur together in a given corpus. There are many different ways of determining co-occurrence data for a given text corpus. One common method is to compute n-grams, in particular bigrams which relate two words to each other and thus analyze the co-occurrence of word pairs. For example, co-occurrence statistics can count how many times a pair of words occurs together in sentences irrespective of their positions in sentences. Such occurrences are called skipping bigram frequencies.

A text corpus used according to this embodiment may contain a large amount of documents such as transcripts of sections of newscasts, movies, or large collections of text from individual websites.

In the present embodiment, co-occurrence data is computed by determining co-occurrences of named-entities within a large text window. For example, co-occurrence data for named-entities that reflects contextual or semantic similarity may be obtained by choosing a complete website or article as the large window for the co-occurrence analysis. A frequent co-occurrence of two named-entities in the same website or article suggests that two words relate to a general topic discussed in the website or in the article. Co-occurrence data obtained in this way may reflect the probability that two named-entities appear together on the same website so that it can be assumed that there is a contextual or semantic relationship between the two named-entities.

In an alternative embodiment, a large window of a defined number of words, e.g. 50 words in each direction, is used as window to determine co-occurrence data.

Co-occurrence data may be computed in advance by statistical means as described above and may reside in a context database on a server (database 26 in FIG. 3). In an alternative embodiment, the co-occurrence data may likewise be located in a database which resides within a memory of the second screen device.

According to an embodiment, each named-entity is represented in the context database by the set of its co-occurrences with other named-entities within a large window, respectively a complete document or article as described above.

FIG. 7 illustrates an example for a representation of named-entities in a context database. In this representation the named-entity "president" is related to the set of named-entities in the same context: {Barack Obama, White House, George Bush, George Washington, lawyer}. Further, in this representation the named-entity "Dow Jones" is related to the set of named-entities in the same context: {stock market, DJIA, index, S&P, price, economy, bull, bear}. Still further, the named-entity "quarterback" is related to the set of named-entities in the same context: {touchdown, NFL, football, offensive}. Finally, the named-entity "weather" is related to the set of named-entities in the same context: {sun, rain, temperature, wind, snow, tomorrow, cold, hot}.

It should be noted that even though in FIG. 7 the named-entities are reproduced as such, the database might express the same relations by relating indices of named-entities to each other, each index referring to a specific named-entity in a list of named-entities comprised in the context database.

In the embodiment described here, co-occurrence statistics is used to disambiguate and correct or suppress misrecognitions by using the semantic similarity between a named-entity in question, and other named-entities that were observed around the same time.

Figure 8:
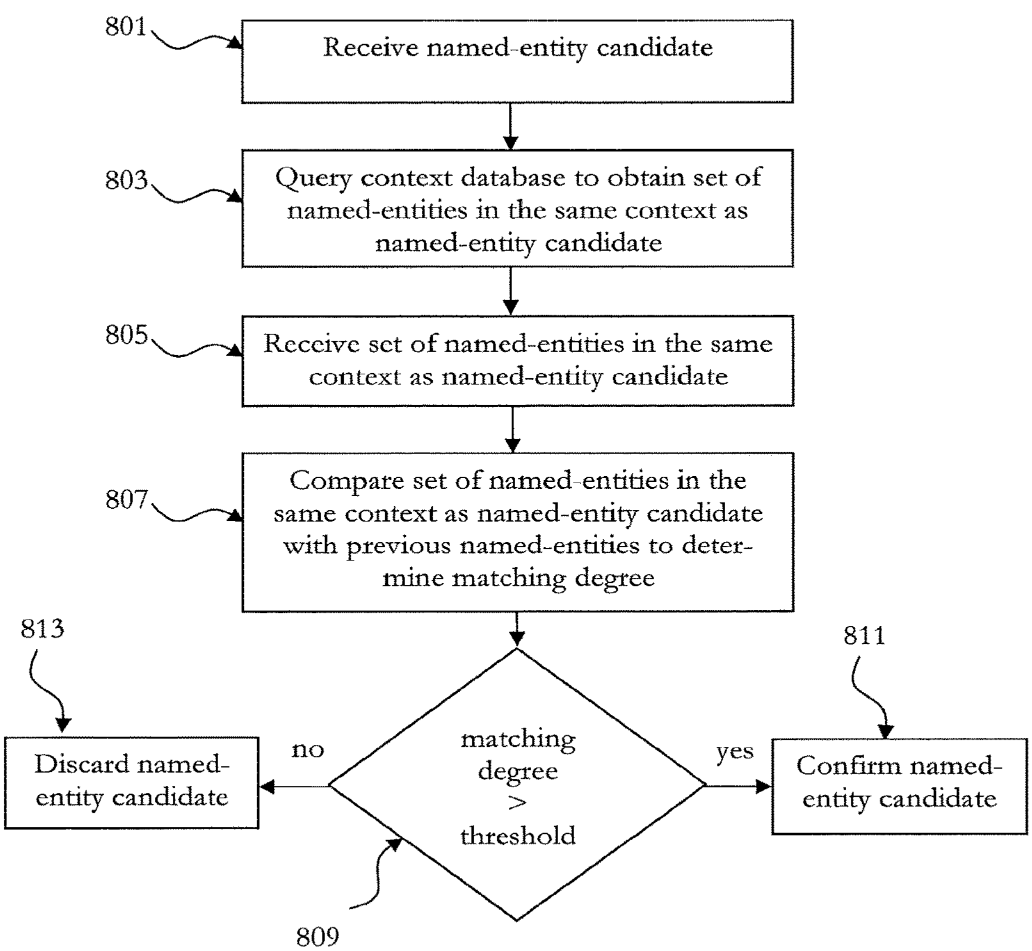
FIG. 8 illustrates a method of confirming the validity of named-entities based on co-occurrence data stored in a context database.

FIG. 8 illustrates a method of confirming the validity of named-entities based on co-occurrence data stored in a context database. This method may be used to suppress misrecognitions when identifying named-entities. The method starts with obtaining a named-entity candidate. At 801 a named-entity candidate is received from a named-entity recognition section. At 803, a context database is queried to obtain a set of named-entities in the same context as the named-entity candidate. At 805, a set of named-entities in the same context as named-entity candidate is received from the context database. At 807, the set of named-entities in the same context as named-entity candidate is compared with previous named-entities obtained from the named-entity recognition section to determine a matching degree. At 809, the thus obtained matching degree is compared with a predefined threshold value. If the matching degree is higher than the threshold, then the processing proceeds with 811, that is the named-entity candidate is confirmed as a valid named-entity. Otherwise, the processing proceeds with 813, that is the named-entity candidate is discarded.

The matching degree can for example be determined in 807 by counting the number of named-entities that exist in the set of named-entities in the same context as the named-entity candidate and that exist at the same time in a list of previous named-entities. The higher this count is, the more likely it is that the named-entity candidate is a valid named-entity.

In the embodiments described above, large windows, respectively complete documents, were used to establish co-occurrence data that reflects contextual relations between named-entities. The skilled person, however, will readily appreciate that in alternative embodiments other ways of determining co-occurrence data can be used, for example computing n-grams, determining directional and non-directional co-occurrence within small windows, or the like.

Still further, in the embodiments described above co-occurrence data is stored in the form as exemplified in FIG. 7. The skilled person, however, will readily appreciate that in alternative embodiments, the co-occurrence data in the database might also be represented in other form, e.g. by a co-occurrence matrix where each element of the co-occurrence matrix represents the probability (or frequency) that the two named-entities to which the matrix element relates appear in the same context.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding.

It should also be recognized that the division of the smartphone 3 in FIG. 2 and of the system of FIG. 3 into units is only made for illustration purposes and that the present disclosure is not limited to any specific division of functions in specific units. For instance, the CPU 9 and the memory 10 could be implemented by a respective programmed processor, field programmable gate array (FPGA) and the like, and/or the two databases 25 and 26 of FIG. 3 could also be implemented within a single database on a single server.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising a processor which is configured to perform speech recognition on an audio signal, linguistically analyze the output of the speech recognition for named-entities, perform an Internet or database search for the recognized named-entities to obtain query results, and display, on a display of the electronic device, information obtained from the query results on a timeline.

(2) The electronic device of (1), wherein the retrieved audio signal relates to a communication between humans, or other speech, like e.g. from a newscast in radio or TV.

(3) The electronic device of (1) or (2), wherein the named-entities describe objects such as persons, organizations, and/or locations.

(4) The electronic device of anyone of (1) to (3), wherein the processor is configured to perform the linguistic analysis by natural language processing.

(5) The electronic device of anyone of (1) to (4), wherein the processor is configured to extract a picture related to a search result that symbolizes a named-entity, and to display the picture obtained from the Internet search on its display.

(6) The electronic device of anyone of (1) to (5), wherein the processor is configured to perform the speech recognition and the linguistic analysis continuously in order to build up a set of query results.

(7) The electronic device of anyone of (1) to (6), wherein each timeline entry is either symbolized by a retrieved picture, by a text string related to the named-entity, or a time stamp.

(8) The electronic device of anyone of (1) to (7), wherein the processor is arranged to disambiguate and correct or suppress misrecognitions by using the semantic similarity between the named-entity in question, and other named-entities that were observed around the same time.

(9) The electronic device of anyone of (1) to (8), wherein the processor is arranged to approximate semantic similarity by evaluating co-occurrence statistics.

(10) The electronic device of anyone of (1) to (9), wherein the processor is arranged to evaluate co-occurrence statistics on large background corpora.

(11) The electronic device of anyone of (1) to (10), wherein the processor is configured to retrieve the audio signal from a microphone.

(12) The electronic device of anyone of (1) to (11), wherein the electronic device is a mobile phone or a tablet computer.

(13) A computer-implemented method, comprising:
- retrieving an audio signal from a microphone,
- performing speech recognition on the received audio signal,
- linguistically analyzing the output of the speech recognition for named-entities,
- performing an Internet or database search for the recognized named-entities to obtain query results, and
- displaying, on a display of an electronic device, information obtained from the query results on a timeline.

(14) A computer program comprising instructions, the instructions when executed on a processor of an electronic device, causing the electronic device to:
- retrieve an audio signal from a microphone,
- perform speech recognition on the received audio signal,
- linguistically analyze the output of the speech recognition for named-entities,
- perform an Internet or database search for the recognized named-entities to obtain query results, and
- display, on a display of the electronic device, information obtained from the query results on a timeline.

The present application claims priority to European Patent Application 15198119.8 filed by the European Patent Office on 4 Dec. 2015, the entire contents of which being incorporated herein by reference.

The invention claimed is:

1. An electronic device, comprising:
circuitry configured to
- perform speech recognition on an audio signal emitted from a content source, the content source outputting the audio signal concurrent with a displayed image on a first display, the content source including the first display and the content source being external to the electronic device;
- linguistically analyze an output of the speech recognition for named-entities;
- perform an Internet or database search for named-entities, that are recognized in the linguistic analysis of the output, to obtain query results; and
- display, on a second display of the electronic device, an output interface displaying information relating to the query results on a timeline, the timeline including a line which includes, for a plurality of search results, the information related to the query results including a time, an image, and a textual description associated with the image, the image and the textual description being graphically linked to a corresponding portion of the line, the timeline displaying the query results in a chronological order.

2. The electronic device of claim 1, wherein
- the audio signal relates to speech program content output by the content source.

3. The electronic device of claim 1, wherein the named-entities describe objects such as persons, organizations, and/or locations.

4. The electronic device of claim 1, wherein the circuitry is configured to perform the linguistic analysis by natural language processing.

5. The electronic device of claim 1, wherein the circuitry is configured to
- extract a picture related to a search result that symbolizes a named-entity, and
- display the picture obtained from the Internet search on the second display.

6. The electronic device of claim 1, wherein the circuitry is configured to perform the speech recognition and the linguistic analysis continuously in order to build up a set of query results.

7. The electronic device of claim 1, wherein the circuitry is configured to disambiguate and correct or suppress misrecognitions by using the semantic similarity between the named-entity in question, and other named-entities that were observed around the same time.

8. The electronic device of claim 1, herein the circuitry is arranged to approximate semantic similarity by evaluating co-occurrence statistics.

9. The electronic device of claim 1, wherein the circuitry is arranged to evaluate co-occurrence statistics on large background corpora.

10. The electronic device of claim 1, wherein the circuitry is configured to retrieve the audio signal from a microphone.

11. The electronic device of claim 1, wherein the electronic device is a mobile phone or a tablet computer.

12. A method performed by an electronic device, the method comprising:
- retrieving an audio signal emitted from a content source, the content source outputting the audio signal concurrent with a displayed image on a first display, the content source including the first display and the content source being external to the electronic device;
- performing speech recognition on the audio signal;
- linguistically analyzing an output of the speech recognition for named-entities;
- performing an Internet or database search for named-entities, that are recognized in the linguistic analysis of the output, to obtain query results; and
- displaying, on a second display of the electronic device, an output interface displaying information relating to the query results on a timeline, the timeline including a line which includes, for a plurality of search results, the information related to the query results including a time, an image, and a textual description associated with the image, the image and the textual description being graphically linked to a corresponding portion of the line, the timeline displaying the query results in a chronological order.

13. A non-transitory computer readable medium storing computer executable instructions which, when executed by circuitry of an electronic device, causes the electronic device to:
- retrieve an audio signal emitted from a content source, the content source outputting the audio signal concurrent with a displayed image on a first display, the content source including the first display and the content source being external to the electronic device;

perform speech recognition on the audio signal;

linguistically analyze an output of the speech recognition for named-entities;

perform an Internet or database search for named-entities, that are recognized in the linguistic analysis of the output, to obtain query results; and display, on a second display of the electronic device, an output interface displaying information relating to the query results on a timeline, the timeline including a line which includes, for a plurality of search results, the information related to the query results including a time, an image, and a textual description associated with the image, the image and the textual description being graphically linked to a corresponding portion of the line, the timeline displaying the query results in a chronological order.

* * * * *